(12) United States Patent
Nedrelid

(10) Patent No.: US 12,179,217 B2
(45) Date of Patent: Dec. 31, 2024

(54) SYSTEM AND METHOD FOR CREATING AND COLLECTING MAGNETIC MICROPLASTICS

(71) Applicant: Nils Nedrelid, Vero Beach, FL (US)

(72) Inventor: Nils Nedrelid, Vero Beach, FL (US)

( * ) Notice: Subject to any disclaimer, the term of this patent is extended or adjusted under 35 U.S.C. 154(b) by 851 days.

(21) Appl. No.: 17/209,186

(22) Filed: Mar. 22, 2021

(65) Prior Publication Data

US 2021/0291197 A1 Sep. 23, 2021

Related U.S. Application Data

(60) Provisional application No. 62/992,756, filed on Mar. 20, 2020.

(51) Int. Cl.
*B03C 1/28* (2006.01)
*B03C 1/02* (2006.01)
(Continued)

(52) U.S. Cl.
CPC ............ *B03C 1/28* (2013.01); *B03C 1/02* (2013.01); *B05D 7/50* (2013.01); *B09B 1/00* (2013.01);
(Continued)

(58) Field of Classification Search
CPC ... B03C 2201/30; B03C 2201/20; B03C 1/02; B03C 1/28; B60C 1/0016; B09B 1/00
See application file for complete search history.

(56) References Cited

U.S. PATENT DOCUMENTS

| 5,895,854 | A | * | 4/1999 | Becherer | ................ | G01P 3/487 |
| | | | | | | 264/108 |
| 2007/0039894 | A1 | | 2/2007 | Cort | | |
| 2021/0214055 | A1 | * | 7/2021 | Maydanik | ............... | B07B 1/005 |

FOREIGN PATENT DOCUMENTS

| WO | 2008010552 A1 | 1/2008 |
| WO | 2008039936 A2 | 4/2008 |
| WO | 2015165251 A1 | 11/2015 |

OTHER PUBLICATIONS

Yáñez-Flores, et al., Preparation and characterization of magnetic PVC nanocomposites, Journal of Non-Crystalline Solids, vol. 353, Issues 8-10, 2007, pp. 799-801. (Year: 2007).*

(Continued)

*Primary Examiner* — Daniel Berns
*Assistant Examiner* — Eric Scott Sherman

(57) ABSTRACT

A system and method for creating and collecting magnetic microplastics effectively combines magnetic material with plastics during their manufacture, thereby producing microplastics that can be easily collected via removal devices equipped with magnetic components. Magnetic particles are mixed with plastic/rubber resins during manufacturing of tires, roofing materials, and other plastic items. The magnetic particles can be made from natural or artificial magnets. After mixing, the partially-magnetic rubber/plastic result can be applied to areas of the manufactured plastic item that have the highest propensity to degrade into microplastic pollutants. For example, the thread of a tire, where friction with the road causes most of the wear, is an optimal location for integration of magnetic particles. When the plastics break down into microplastics, the microplastics can then be collected with magnets. The collected microplastics can then be removed from the magnetic collectors during routine maintenance and subsequently recycled safely.

11 Claims, 6 Drawing Sheets

(51) Int. Cl.
  *B05D 7/00* (2006.01)
  *B09B 1/00* (2006.01)
  *B60C 1/00* (2006.01)
  *C02F 1/48* (2023.01)
  *C02F 101/30* (2006.01)
  *E04D 5/08* (2006.01)
  *B09C 1/00* (2006.01)

(52) U.S. Cl.
  CPC ............ B60C 1/0016 (2013.01); C02F 1/488 (2013.01); E04D 5/08 (2013.01); *B03C 2201/20* (2013.01); *B03C 2201/30* (2013.01); *B09C 1/002* (2013.01); *C02F 2101/30* (2013.01)

(56) References Cited

OTHER PUBLICATIONS

Lassen, et al., Microplastics, Occurrence, effects, and sources of releases to the environment in Denmark, Danish Environmental Protection Agency, DTU, 2015 (Year: 2015).*

Lin, et al. (2003), Preparation of magnetic poly(vinyl alcohol) (PVA) materials by in situ synthesis of magnetite in a PVA matrix. J. Appl. Polym. Sci., 87: 1239-1247 (Year: 2003).*

Grbic, Jelena & Nguyen, Brian & Guo, Edie & You, Jae & Sinton, David & Rochman, Chelsea. (2019). Magnetic Extraction of Microplastics from Environmental Samples. Environmental Science & Technology Letters. 6. 10.1021/acs.estlett.8b00671.

Magnetic Powder, retrieved from the internet, retrieved on Feb. 6, 2020; <URL: https://www.sciencedirect.com/topics/chemistry/magnetic-powder>.

\* cited by examiner

SYSTEM AND METHOD FOR CREATING AND COLLECTING MAGNETIC MICROPLASTICS

The current application claims a priority to the U.S. Provisional Patent application Ser. No. 62/992,756 filed on Mar. 20, 2020. The current application is filed on Mar. 22, 2021 while Mar. 20, 2021 was on a weekend.

FIELD OF THE INVENTION

The present invention generally relates to antipollution systems and methods. More specifically, the present invention provides systems and methods for the collection and removal of microplastics from various sources.

BACKGROUND OF THE INVENTION

Plastic pollution has been an issue of increasing importance since the invention of plastic. Plastic products have littered beaches and the sides of roadways for decades, and large floating "islands" of plastic garbage in several oceans have been found. As of lately, there has been increasing investigation into a relatively recently discovered issue of microplastics and the health hazards they pose to humans and wildlife. Microplastics are pieces of plastic or rubber smaller than five millimeters (mm) in size produced from plastic products left in nature breaking down overtime, generally due to any of or any combination of excessive exposure to solar radiation, mechanical fatigue during intended use, imperfection propagation, or more. Microplastics can be mistaken for food by small fish and other life forms and, after consumption, will subsequently accumulate in larger creatures as microplastics move up the food chain. Synthetic roofing membranes, thermoplastics, and thermosetting polymeric materials such as polyvinyl chloride (PVC), thermoplastic olefin (TPO), ethylene propylene diene monomer (EPDM), expanded polystyrene (EPS), chlorosulfonated polyethylene (CSPE), and plastic/rubber modified bitumen are some of the common plastics which are known to generate excessive microplastics.

Although plastic products are normally discarded at a landfill and rarely thrown into oceans or other outdoor areas, plastic products still degrade due to UV exposure and erosion from acid rain, snow, wind, hail, and foot traffic during intended use. With rain, wind and snow melt, microplastics from degraded roofing may be transported into drainage ditches, canals, waterways, lakes and oceans. To this group also belong rubber tires from vehicles. Although tires are also susceptible to damage by aging, UV and erosion, just as plastics, tires further experience an additional rapid material degradation due to contact with the roadways. As the tires wear down, the tiny rubber particles find their way into nature and waters. Other types of plastics and synthetic materials that are exposed to UV and weather or erosion/friction include plastic lumber, awnings, tarpaulins, synthetic siding, synthetic doors and window frames, as well as various types of paints and coatings. Magnetic particles can also be used in household items like plastic bottles, straws, utensils, and containers. Currently there are no known methods that allow the collection of microplastics once the microplastics have entered waterways such as canals/rivers/lakes and oceans. The microplastics simply cannot be netted up, as that would cause damage to animal and plant life. Further complicating microplastic collection is that some denser microplastics may sink to the very depths of the oceans, rendering many filtration techniques obsolete.

What is needed is a mechanism by which microplastics can be combined with easily-collectible material, thus facilitating collection and separation of microplastics from the domain of ocean wildlife.

The present invention addresses this issue. The present invention is a system and method for creating and collecting magnetic microplastics that effectively combines magnetic material with plastics during their manufacture, thereby producing microplastics that can be easily collected via removal devices equipped with magnetic components. Magnetic particles will be mixed in with plastic/rubber resins during manufacturing of tires, roofing materials, and other types of plastic items. The magnetic particles can be made from natural or artificial magnets, such as ceramic magnets, rare earth magnets, ferrite, iron, steel, lodestone, magnetite, and more. The rubber/plastic mixed with magnetic particles can be focused in areas of the manufactured plastic item that have the highest propensity to degrade into microplastic pollutants. For example, the thread of a tire where friction with the road causes most of the wear and is thus an optimal location for integration of magnetic particles. Similarly, the surfacing layer of a synthetic roof membrane that is always exposed to sun and weather, and the topcoat in an exterior paint/coating system, are further examples of components that may be useful targets for magnetic particle integration. When these plastic items break down into microplastics, the microplastics can be collected with magnets. Furthermore, when microplastics break off from the plastic/rubber items, some of the travel pattern is often predictable. For example, in many roofing systems, most of the particles are flushed into drains, scuppers, and/or gutters. These are therefore optimal locations for installation of magnetic particle collectors. The collected microplastics can then be removed from the magnetic collectors during routine maintenance and recycled. For rubber tires on vehicles, loose microplastics may collide with the insides of wheel wells or the underside of the vehicle. Both locations therefore provide useful placement locations for magnetic collectors, which could also collect magnetic microplastics from other vehicles' tires. Magnetic collectors can also be placed at drains and scuppers in the roadways, ditches, canals, spillways, bridge pillars and buoys in lakes, rivers and oceans. Magnetic collectors can further be trawled behind vessels in lakes, rivers, and oceans with minimal danger to animal and plant life.

DETAILED DESCRIPTION OF THE INVENTION

All illustrations of the drawings are for the purpose of describing selected versions of the present invention and are not intended to limit the scope of the present invention.

Figure 1:
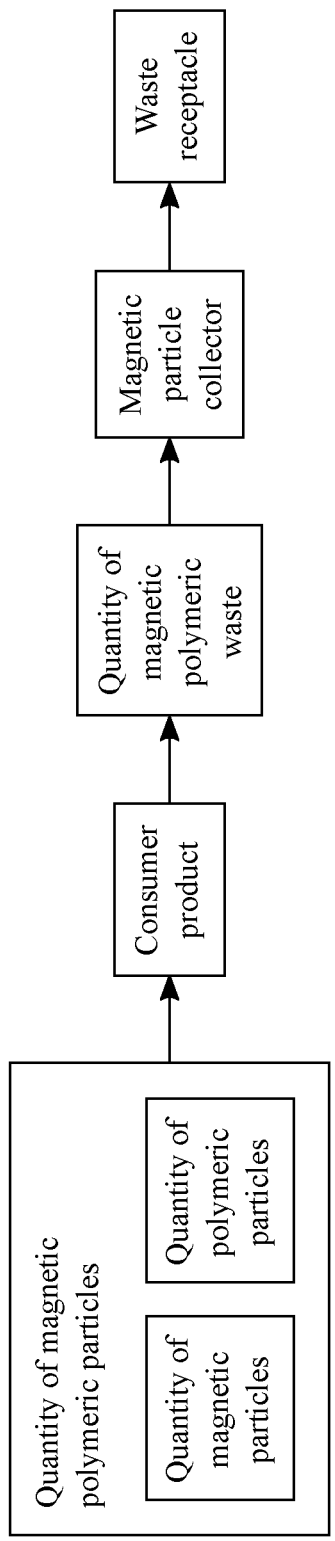
FIG. 1 is a block diagram illustrating the system of the present invention.

The present invention is a system and method for creating and collecting magnetic microplastics in which magnetic microplastic materials are created, integrated into existing plastic products, and subsequently removed from pollution sources, especially runoff water. The present invention reduces the pervasion of microplastics in the environment by controlling the runoff of microplastics from plastic or rubber items. The system of the present invention includes at least one magnetic particle collector, a quantity of magnetic particles, a quantity of polymeric particles, and a waste receptacle (Step A), as represented in FIG. 1. The magnetic particle collector relates to a device equipped with magnetic components, including, but not limited to, any or any combination of permanent magnets, electromagnets, rare earth magnets, and more, along with the mechanism or mechanisms required to connect the magnetic components to relevant surfaces during use. The quantity of magnetic particles relates to a volume of magnetic molecules or particulates which may be easily integrated into a polymeric product during its manufacture. The quantity of polymeric particles denotes a volume of polymeric molecules which are manufactured into a product via any of a variety of polymer processing methods, including, but not limited to, cross-linking, networking, thermoplastic processing methods, and more. The waste receptacle is a container which may be used for the collection and subsequent removal of plastic or microplastic waste matter resulting from degradation of plastic items or products.

Figure 2:
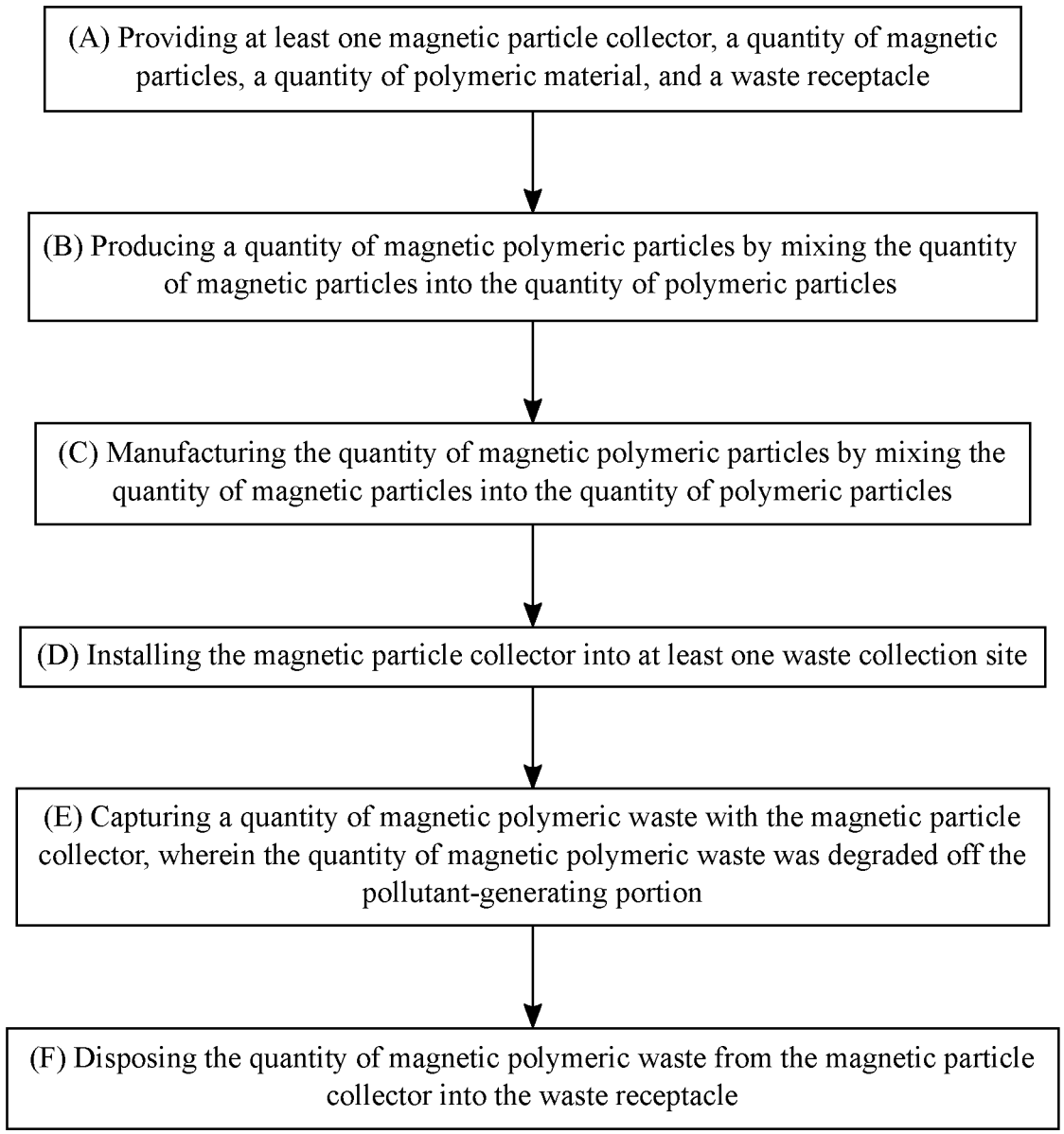
FIG. 2 is a flowchart illustrating the overall process of the present invention.

The overall process followed by the method of the present invention allows for effective and efficient generation and lifecycle maintenance of magnetic-plastic objects. A quantity of magnetic polymeric particles is produced by mixing the quantity of magnetic particles into the quantity of polymeric particles (Step B), as represented in FIG. 2. This particle combination step will ideally produce a generally homogeneous combination of the quantity of magnetic particles and the quantity of polymeric particles, resulting in the quantity of magnetic polymeric particles having both the physical properties of the quantity of polymeric particles and the magnetic properties of the quantity of magnetic particles. Next, the quantity of magnetic polymeric particles is manufactured into at least one pollutant-generating portion of a consumer product (Step C). The quantity of magnetic polymeric particles may be integrated into the consumer product in a variety of positions, including, but not limited to, locations of potentially high stress or fatigue, throughout the consumer product, in layered configurations or films, and more. The magnetic particle collector is then installed into at least one waste collection site (Step D). This arrangement allows the waste collection site to magnetically attract the quantity of magnetic polymeric particles. Subsequently, a quantity of magnetic polymeric waste is captured with the magnetic particle collector, wherein the quantity of magnetic polymeric waste was degraded off the pollutant-generating portion (Step E). In this way, waste material generated from normal usage of the consumer product may be collected, rather than allowed to move freely into water sources as runoff or otherwise allowed to contaminate local ecological areas. Finally, the quantity of magnetic polymeric waste is disposed from the magnetic particle collector into the waste receptacle (Step F). Thus, the quantity of magnetic polymeric waste is removed from rooftops, tires, waterways, or other items and locations where polymeric waste may otherwise agglomerate and disrupt natural ecologies.

The quantity of polymeric particles must include particles which are especially abundant in plastics manufacturing and susceptible to degradation due to mechanical wear resulting from either fatigue during use, solar radiation, fluid erosion, or other such sources of plastic material degradation. To this end, the quantity of polymeric particles may be made of at least one material selected from the group consisting of: plastic, rubber, and a combination thereof. Plastics and rubbers of all varieties are both abundant in their applications to various products as well as environmentally devastating in microplastic form when unregulated, making such materials ideal for combination with the quantity of magnetic particles.

The quantity of magnetic particles must be easy to manufacture and integrate into existing polymeric products and materials. To this end, the quantity of magnetic particles may be made of at least one material selected from the group consisting of: ceramic magnetic material, rare-earth magnetic material, ferrite, iron, steel, lodestone, magnetite, and combinations thereof. These materials are known for being durable and highly magnetic under appropriate conditions while also being environmentally inert, or at least minimally-invasive.

Figure 3:
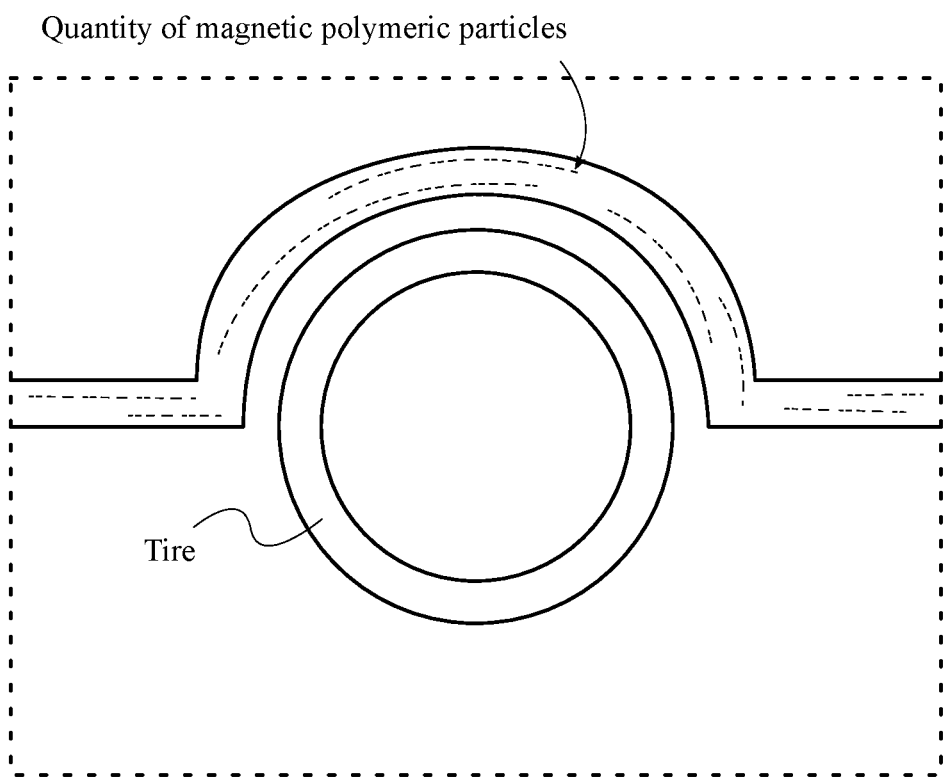
FIG. 3 is a diagram illustrating application of the present invention to a tire.
Figure 4:
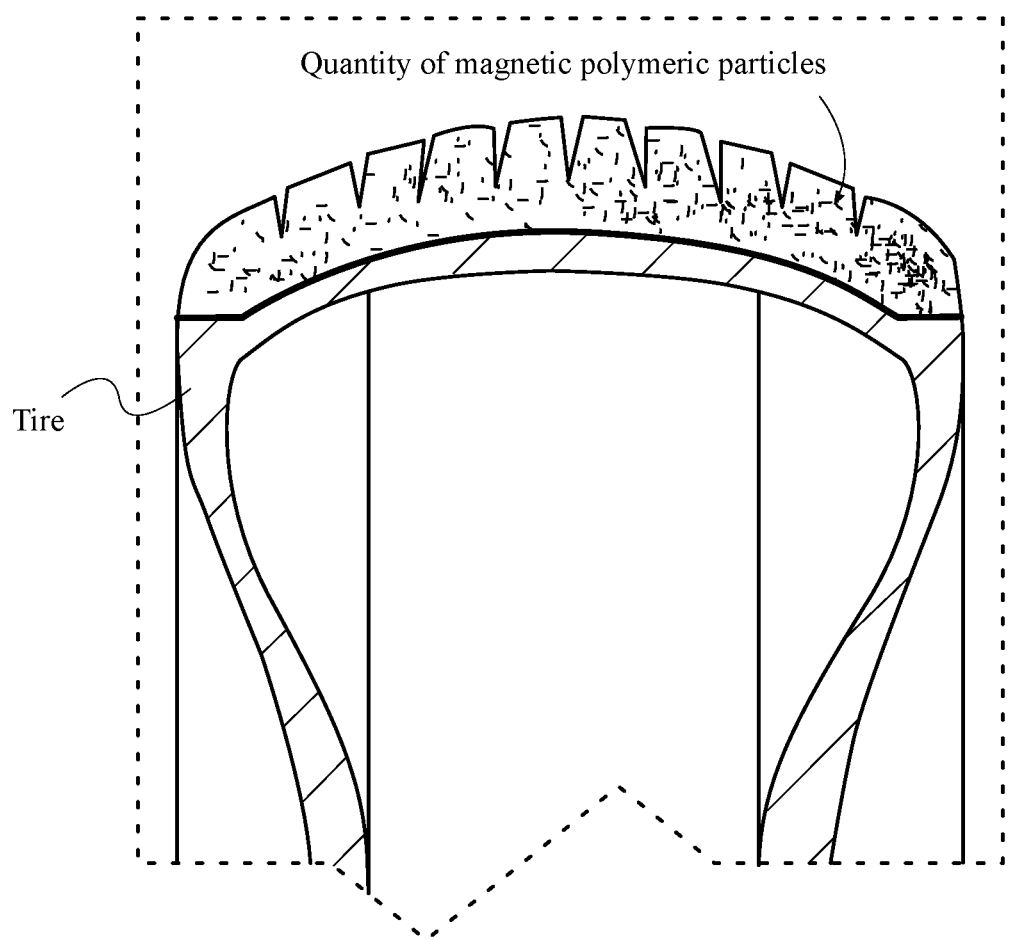
FIG. 4 is a diagram illustrating application of the present invention to a tire.

Among items that are common sources of microplastic pollution are vehicle tires. To this end, the consumer product may be a tire, wherein the pollutant-generating portion may be a threaded portion of the tire, as represented in FIGS. 3 and 4. The threaded portion of the tire is the segment of tire most likely to chip or degrade over time during use. This arrangement, therefore, ensures that the most likely area of the tire to decompose breaks into magnetic pieces, thereby enabling collection of waste material via the magnetic particle collector.

Particularly in accordance with application to tires, the waste collection site benefits from being placed in an advantageous location relative to the consumer product. To this end, the quantity of magnetic polymeric waste may be degradation from at least one tire, wherein the waste collection site may be selected from the group consisting of: at least one inlet of a street drainage system, at least one outlet of a street drainage system, at least one location within the street drainage system, at least one part of a vehicle, and combinations thereof. By placing the waste collection site into a position which often receives a large amount of tire waste, the waste collection site can more effectively prevent the quantity of magnetic polymeric waste from the tire from affecting a local ecology or wildlife in general.

Among the common culprits for microplastic-generation is synthetic rooftops, which degrade over time due to exposure to the sun as well as exposure to rain and wind. To this end, the consumer product may be a synthetic rooftop, wherein the pollutant-generating portion may be an exposed surfacing layer of the synthetic rooftop. Thus, synthetic rooftops are accounted for as having high pollution-reducing potential.

Synthetic rooftops are especially susceptible to degradation over time due to their employment of certain polymeric materials. Therefore, the synthetic rooftop may be made of at least one material selected from the group consisting of: polyvinyl chloride (PVC), thermoplastic olefin (TPO), ethylene propylene diene monomer (EPDM), expanded polystyrene (EPS), chlorosulfonated polyethylene (CSPE), plastic/rubber modified bitumen, and combinations thereof. These materials are likely to degrade over time during use, making them ideal candidates for integration of the quantity of magnetic polymeric particles.

As is the case when the consumer product is a tire, the waste collection site benefits from advantageous positioning relative to a synthetic rooftop. To this end, the quantity of magnetic polymeric waste may be degradation from a synthetic rooftop, wherein the waste collection site may be a roof gutter, adjacent to the synthetic roof. This arrangement ensures optimal positioning of the waste collection site, enabling collection of magnetic microplastic runoff as runoff occurs.

Figure 5:
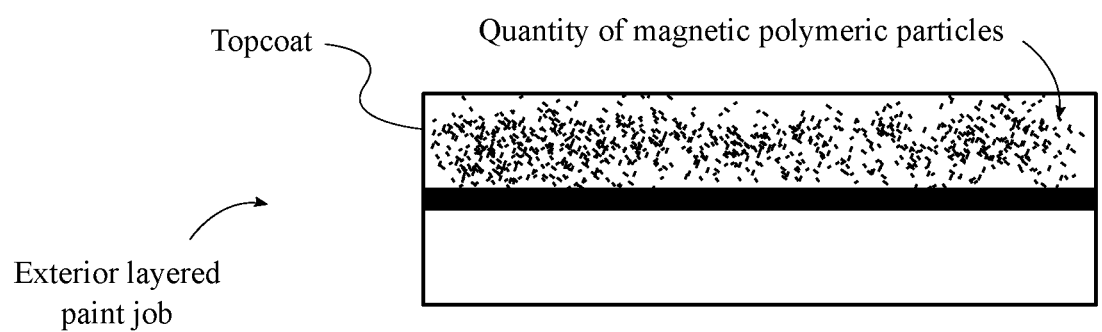
FIG. 5 is a diagram illustrating application of the present invention to a paint layer.

It may further be common for paints and coatings to be made of polymeric materials, making such paints susceptible to polluting degradation. To account for this, the consumer product may be an exterior layered paint job, wherein the pollutant-generating portion may be a topcoat of the exterior layered paint job, as represented in FIG. 5. This arrangement of the topcoat atop the exterior layered paint job ensures that the quantity of magnetic polymeric waste is generated before non-magnetic waste can form, thereby enabling the magnetic particle collector to gather generated waste matter.

Pollution from microplastics in a layered paint job often tends to disperse as runoff over specific surfaces and areas. To this end, the quantity of magnetic polymeric waste may be degradation from an exterior layered paint job, wherein the waste collection site may be selected from the group consisting of: at least one inlet of a community drainage system, at least one outlet of the community drainage system, at least one location within the community drainage system, and combinations thereof. In this way, microplastic pollution management may be implemented at the municipal level, enabling collection of magnetic microplastics from the exterior layered paint job.

In general, there are a wide variety of applications and products made of polymeric materials which degrade over time. To address these cases, the quantity of magnetic polymeric waste may travel along a specific natural path or a specific man-made path, wherein the waste collection site may be a point along the specific natural path or the specific man-made path. In this way, the waste collection site can be positioned advantageously over many different applications.

Figure 6:
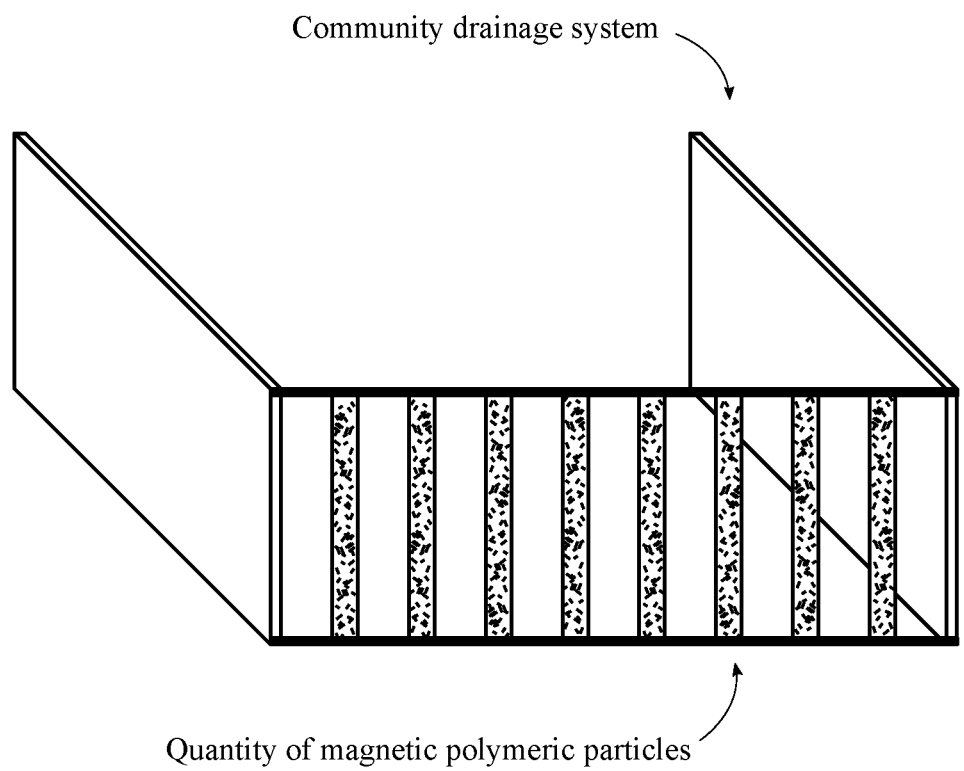
FIG. 6 is a diagram illustrating application of the present invention to a drainage system.

Furthermore, it is often the case that magnetic microplastics may find their way into waterways and large bodies of water, such as oceans, lakes, rivers, streams, and more. In order to prevent ecological damage due to the presence of magnetic microplastics in these locations, the waste collection site may be selected from the group consisting of: at least one drain emptying into a body of water, as represented in FIG. 6, at least one vehicle traveling through the body of water, at least one stationary object within the body of water, at least one portion of a shore for the body of water, and combinations thereof. In this way, boats, buoys, nets, drainage pipes, and other devices may be equipped and utilized to reduce the overall pollution affecting a given area.

Although the invention has been explained in relation to its preferred embodiment, it is to be understood that many other possible modifications and variations can be made without departing from the spirit and scope of the invention as hereinafter claimed.

What is claimed is:

1. A method for creating and collecting magnetic microplastics, the method comprising the steps of:
   (A) providing at least one magnetic particle collector, a quantity of magnetic particles, a quantity of polymeric particles, and a waste receptacle;
   (B) producing a quantity of magnetic polymeric particles by mixing the quantity of magnetic particles into the quantity of polymeric particles;
   (C) manufacturing the quantity of magnetic polymeric particles into at least one pollutant-generating portion of a consumer product;
   (D) installing the at least one magnetic particle collector into at least one waste collection site, wherein the at least one waste collection site is a roof gutter, adjacent to a synthetic roof;
   (E) capturing a quantity of magnetic polymeric waste with the at least one magnetic particle collector, wherein the quantity of magnetic polymeric waste was degraded off the at least one pollutant-generating portion, wherein the quantity of magnetic polymeric waste is degradation from the synthetic rooftop; and
   (F) disposing the quantity of magnetic polymeric waste from the at least one magnetic particle collector into the waste receptacle.

2. The method for creating and collecting magnetic microplastics, the method as claimed in claim 1, wherein the quantity of polymeric particles is made of at least one material selected from the group consisting of: plastic, rubber, and a combination thereof.

3. The method for creating and collecting magnetic microplastics, the method as claimed in claim 1, wherein the quantity of magnetic particles is made of at least one material selected from the group consisting of: ceramic magnetic material, rare-earth magnetic material, ferrite, iron, steel, lodestone, magnetite, and combinations thereof.

4. The method for creating and collecting magnetic microplastics, the method as claimed in claim 1, wherein the consumer product is a synthetic rooftop, and wherein the at least one pollutant-generating portion is an exposed surfacing layer of the synthetic rooftop.

5. The method for creating and collecting magnetic microplastics, the method as claimed in claim 4, wherein the synthetic rooftop is made of at least one material selected from the group consisting of: polyvinyl chloride (PVC), thermoplastic olefin (TPO), ethylene propylene diene monomer (EPDM), expanded polystyrene (EPS), chlorosulfonated polyethylene (CSPE), plastic/rubber modified bitumen, and combinations thereof.

6. The method for creating and collecting magnetic microplastics, the method as claimed in claim 1, wherein the quantity of magnetic polymeric waste travels along a natural path or a man-made path, and wherein the at least one waste collection site is a point along the natural path or the man-made path.

7. A method for creating and collecting magnetic microplastics, the method comprising the steps of:
   (A) providing at least one magnetic particle collector, a quantity of magnetic particles, a quantity of polymeric particles, and a waste receptacle;
   (B) producing a quantity of magnetic polymeric particles by mixing the quantity of magnetic particles into the quantity of polymeric particles;
   (C) manufacturing the quantity of magnetic polymeric particles into at least one pollutant-generating portion of a consumer product;
   (D) installing the at least one magnetic particle collector into at least one waste collection site, wherein at least one the waste collection site is selected from the group consisting of: at least one inlet of a community drainage system, at least one outlet of the community drainage system, at least one location within the community drainage system, and combinations thereof;
   (E) capturing a quantity of magnetic polymeric waste with the at least one magnetic particle collector, wherein the quantity of magnetic polymeric waste was degraded off at least one the pollutant-generating portion, and wherein the quantity of magnetic polymeric waste is degradation from an exterior layered paint job; and (F) disposing the quantity of magnetic polymeric waste from the at least one magnetic particle collector into the waste receptacle.

8. The method for creating and collecting magnetic microplastics, the method as claimed in claim 7, wherein the quantity of polymeric particles is made of at least one material selected from the group consisting of: plastic, rubber, and a combination thereof.

9. The method for creating and collecting magnetic microplastics, the method as claimed in claim 7, wherein the quantity of magnetic particles is made of at least one material selected from the group consisting of: ceramic magnetic material, rare-earth magnetic material, ferrite, iron, steel, lodestone, magnetite, and combinations thereof.

10. The method for creating and collecting magnetic microplastics, the method as claimed in claim 7, wherein the consumer product is an exterior layered paint job, and wherein the at least one pollutant-generating portion is a topcoat of the exterior layered paint job.

11. The method for creating and collecting magnetic microplastics, the method as claimed in claim 7, wherein the quantity of magnetic polymeric waste travels along a natural path or a man-made path, and wherein the at least one waste collection site is a point along the natural path or the man-made path.

* * * * *